Dec. 26, 1950     M. P. VILLANE ET AL     2,535,882
BOTTLE CONTENTS QUANTITY INDICATOR
Filed May 22, 1947
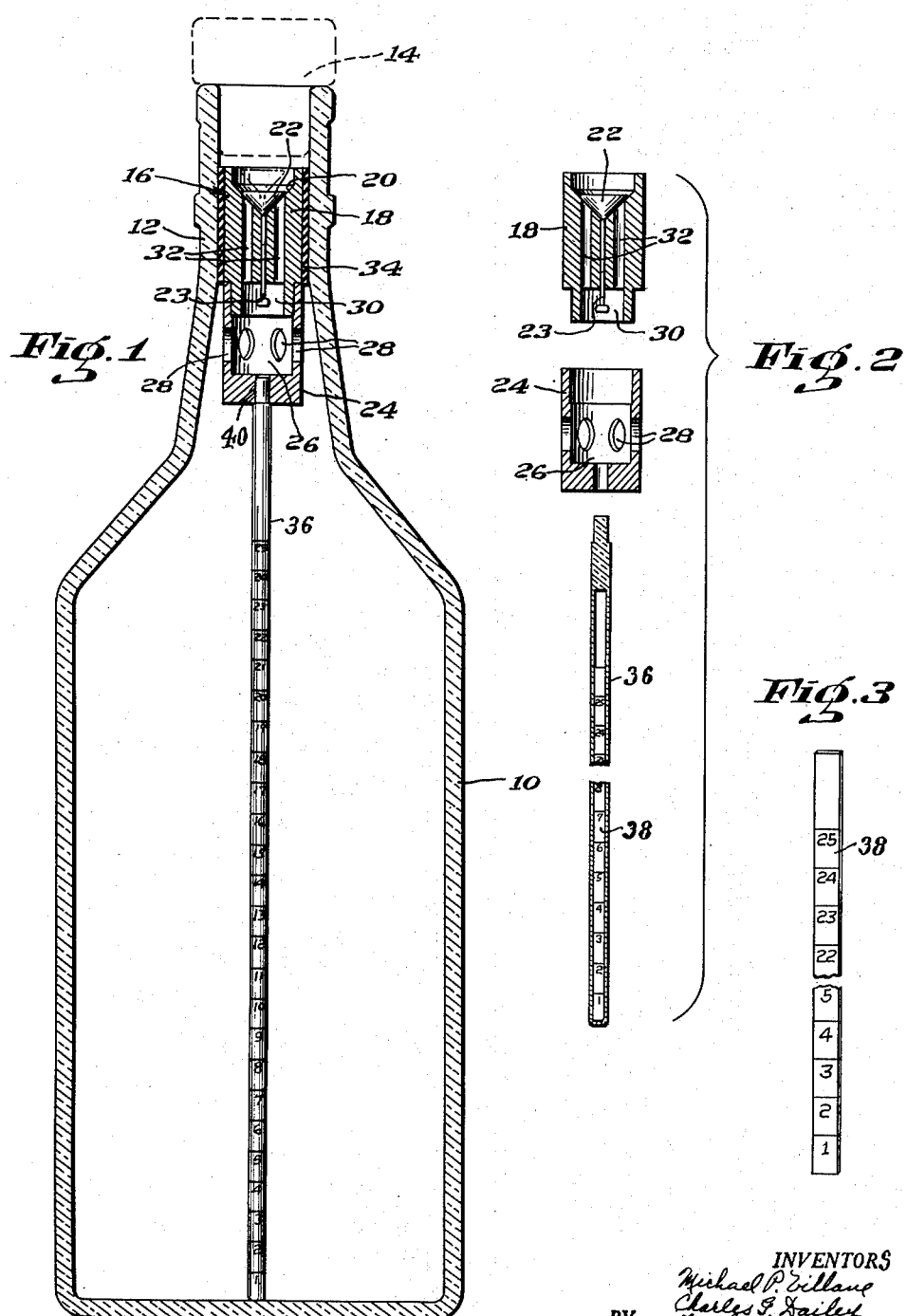

Patented Dec. 26, 1950

2,535,882

UNITED STATES PATENT OFFICE 2,535,882

BOTTLE CONTENTS QUANTITY INDICATOR

Michael P. Villane, Hyde Park, Charles G. Dailey, West Medford, and Frank R. Wisentaner, Roxbury, Mass.; said Dailey assignor to said Villane and said Wisentaner Application May 22, 1947, Serial No. 749,638

2 Claims. (Cl. 215—8)

This invention relates to improvements in bottle contents quantity indicators, and more particularly to such bottle indicators which include means for discouraging any re-filling or partial re-filling of a bottle.

Numerous devices have been proposed heretofore for making it practically impossible or impractically difficult to re-fill bottles or to flow liquid in any amount into a bottle equipped with such a preventive device. Also, it has been proposed heretofore to associate with such a preventive device a means intended visibly to indicate the quantity of liquid which at any time remains in a partially used bottle.

However, the prior non-re-fill devices have been complicated and expensive to produce, and have required specially made bottles for effectively accommodating them, and the prior quantity indicators which have been associated with the non-re-fill devices customarily have involved a float operating on a scale with a ratchet-like action so that the float is intended to drop with the level of liquid in the bottle and be latched against rising above its newly assumed level. But these prior float indicators, while they implement the non-fill device by indicating any re-filling of the bottle, are not dependably accurate for indicating the exact quantity of liquid which, at any time, remains in the bottle. Agitation of the liquid in a partially filled bottle, such as by shaking the bottle, may cause the float to descend and be latched below the level of the liquid in the bottle when it is held upright. Hence, the position of the float on a scale depends to a considerable extent upon how any particular bottle has been handled, and is unreliable for giving an accurate indication of the quantity of liquid in the bottle.

In the liquor industry, for example, huge sums of money are lost to the proprietors of bars because of the lack, heretofore, of any effective means for checking, from day to day, on the number of drinks dispensed by the bar-tenders, or for taking a quick accurate inventory of stock on hand at the end of a day or week. There has been no practical way of quickly determining how many drinks have been dispensed from a partially filled bottle at the bar or how many ounces remain in the bottle. Guess work has been the rule, yet a single ounce drink usually is sold for forty to sixty cents, which means that a wrong guess either way of an ounce or more per bottle at a bar may amount to a considerable discrepancy for the bar as a whole. Also, if a bar-tender desires to serve free drinks to friends, or himself drinks free ones, the fact is not readily detectable and, if the amount of liquor thus consumed is substantial, the bar-tender readily may cover up by dilution of the remaining liquor in a bottle or bottles.

Also, the lack of any adequate check and accurate day to day inventory opens the way for entire bottles of liquor to be smuggled out of the establishment without the loss to the propiretor being readily found out.

It is among the objects of the present invention to provide a combined non-re-fill and quantity indicator device which is adapted to be inserted in the standard makes of bottles and to be substantially non-removable therefrom after insertion, so that the indicator continues to indicate accurately the quantity of liquid in the bottle until the entire contents have been dispensed. It is a feature that both the non-fill and the indicating features are embodied in a device which can be manufactured at a cost low enough to permit discarding of the device with an empty bottle, and can be made in a few sizes to fit any of the customary sizes and shapes of bottles without interfering with the normal corking or sealing of the bottles in the usual manner.

Another object is to provide a combined non-re-fill and quantity indicator device for standard bottles of which the non-re-fill part is an inexpensive valved plug which makes it impracticably difficult to flow liquid into a bottle but permits free outflow.

Yet another object is to provide an inexpensive combined non-re-fill and quantity indicator device for standard bottles wherein the indicator is a rigid transparent tube on the inner end of the non-re-fill stopper of length to engage the bottom of the bottle when the non-re-fill stopper is pressed to place below the normal position of the regular cork or cap in or on the bottle neck, there being a scale made of paper or the like sealed within the transparent tube.

A further object is to provide a combined non-re-fill and quantity indicator device whose non-re-fill part may be uniform for all types and shapes of bottles excepting a fitting cork ring or the like which may vary in thickness to adapt the non-re-fill part for secure engagement in bottle necks of different interior diameters and/or tapers.

It is, moreover, a purpose and object of the invention generally to improve the structure, adaptability and accuracy of combined non-re-fill and quantity indicator devices for bottles and more especially such devices capable of insertion in standard types and sizes of bottles.

In the accompanying drawing:

Fig. 1 is a medial, vertical cross-sectional view of a standard type of bottle having therein a combined non-re-fill and quantity indicator device embodying features of the present invention;

Fig. 2 shows the non-re-fill and indicator device parts in separated relation on a larger scale and with all but the valve in medial, vertical cross-section; and Fig. 3 is a perspective of the insert scale with a central portion thereof broken away.

Referring to the drawing, the standard type of whiskey bottle 10 may be considered representative of bottles in general which have a restricted neck portion 12 whose mouth may be closed by a usual cork 14 or other sealing closure means.

According to the invention, an insert valved plug, indicated generally at 16, is forced a substantial distance into the neck of the bottle so that it will not interfere with the insertion of the cork 14, or other closure means in the customary manner.

As herein shown, the insert plug 16 comprises an outer or upper body section 18 which has a recess 20 at its outer end for reception of the gravity-closing valve 22, and an inner or lower body section 24 which is interiorly chambered at 26 and which is secured to the inner end of section 18. A series of radial openings 28 extend through the side walls of section 24 to permit free flow of liquid contents of the bottle into the chamber 26 when the bottle is tipped for dispensing liquid therefrom. The inner end portion of section 18 is chambered as at 30 and the inner end of the valve stem 23 is headed over in chamber 30 to prevent removal of the valve. The valve stem 23 extends loosely and axially through section 18 and is long enough to permit unseating of the valve 22 a substantial amount in response to pressure of out-flowing liquid when the bottle is suitably tipped, and the valve seats itself by gravity when the bottle is upright as in Fig. 1. A series of longitudinal passages 32 extend through section 18 from chamber 30 to recess 20 for out-flow when valve 22 is unseated.

Preferably, and economically, the insert plug sections 18, 24, and the mounted valve 22 may be uniform for all types and sizes of bottles, but a cork ring 34, or the like engages around the section 18 and may vary in thickness or exterior shape to adapt the insert plug for tight press fit in any particular bottle neck. The fit should be such that, once the plug insert 16 is pressed to operative position in a bottle neck, it will be removable only with a great amount of difficulty.

The insert plug sections 18, 24 may be secured together in any convenient manner, as by press-fitting a reduced inner end portion of section 18 into the outer end of section 24.

It will be apparent that the simple and economical valved plug-insert 16 is not absolutely proof against in-flowing of liquid past the valve if a person has the means and the inclination so to do, but the valved insert-plug is of a nature to make it impractically difficult for a bartender, for example, to tamper with a bottle and its contents without being detected.

Associated with the valve plug-insert 16 is a rigid transparent tube 36 within which is a scale 38 made of paper or the like. The scale may be an inexpensive strip of paper because it is completely sealed within the tube 36 whose opposite ends are closed. The outer end of the tube preferably is reduced and press-fitted into the inner wall of the plug section 24, as at 40, or the tube may be otherwise secured to section 24, as may be desired. In every case, however, the tube and scale will be of length and calibration to suit the particular type and shape of bottle with which they are to be associated. Obviously their length and calibration will be different for a short, stubby bottle than for a tall, slender bottle. However, considering the bottles prevalent in the liquor industry, only relatively few variations in the tube and scale, and in the cork ring 34, are required for accommodating the invention to all of the more common types and shapes of bottles.

It is not material whether the non-fill and quantity indicator devices are installed in the bottles at the time of filling or subsequently by the proprietor of a bar as each bottle comes to the bar from the stock room. In either case, the device, after installation, always will accurately indicate the quantity of liquid in a bottle at any particular time and will constitute a means for discouraging attempts to dilute contents of a bottle.

With the device of the invention, the proprietor of a bar quickly can make an accurate inventory of his stock so that he may know from day to day the exact amount of stock on hand. And, since the invention enables him to accurately determine the quantity of liquor remaining in partially used bottles, he quickly and easily can determine the number of drinks which have been dispensed, for a quick check with the cash register. In other words, the invention provides an inexpensive, practical and accurate means whereby the proprietor of a bar, for example, quickly may check on and stop losses due to wastage, free dispensing, free drinking and smuggling away of full bottles, which have in the past caused heavy losses to proprietors of bars and the like.

We claim as our invention:

1. A contents quantity indicator for bottles comprising a body having size and shape for passing through the mouth of a bottle to a predetermined location in the neck of the bottle substantially inward of the said mouth, means in said body for permitting outflow of bottle contents but adapted to obstruct inflow of liquid to said bottle, and a stiff linear member projecting at the inner end of said body and having length for engaging the bottom of the bottle when said body is at its said predetermined location in the neck of the bottle, said stiff linear member limiting the inward movement of said body, and said body, when at its said predetermined location, maintaining said stiff member in its said engagement with the bottom of the bottle, said stiff member having means thereon for accurately indicating the quantity of contents of the bottle only when maintained in its said engagement with the bottom of the bottle.

2. A contents quantity indicator for bottles as in claim 1 wherein said stiff linear member is a tube of transparent material and said indicating means is a graduated strip of flexible material sealed within said tube.

MICHAEL P. VILLANE.
CHARLES G. DAILEY.
FRANK R. WISENTANER.

REFERENCES CITED

The following references are of record in the file of this patent:

UNITED STATES PATENTS

| Number | Name | Date |
| --- | --- | --- |
| 174,240 | Hicks | Feb. 29, 1876 |
| 771,477 | Kern | Oct. 4, 1904 |
| 824,278 | Brunette | June 26, 1906 |
| 964,623 | Ely | July 19, 1910 |
| 1,047,662 | Langton | Dec. 17, 1912 |
| 2,293,475 | Serra | Aug. 18, 1942 |